(No Model.)
T. T. ROGERS.
SLEIGH RUNNER FOR WHEELED VEHICLES.
No. 432,083. Patented July 15, 1890.
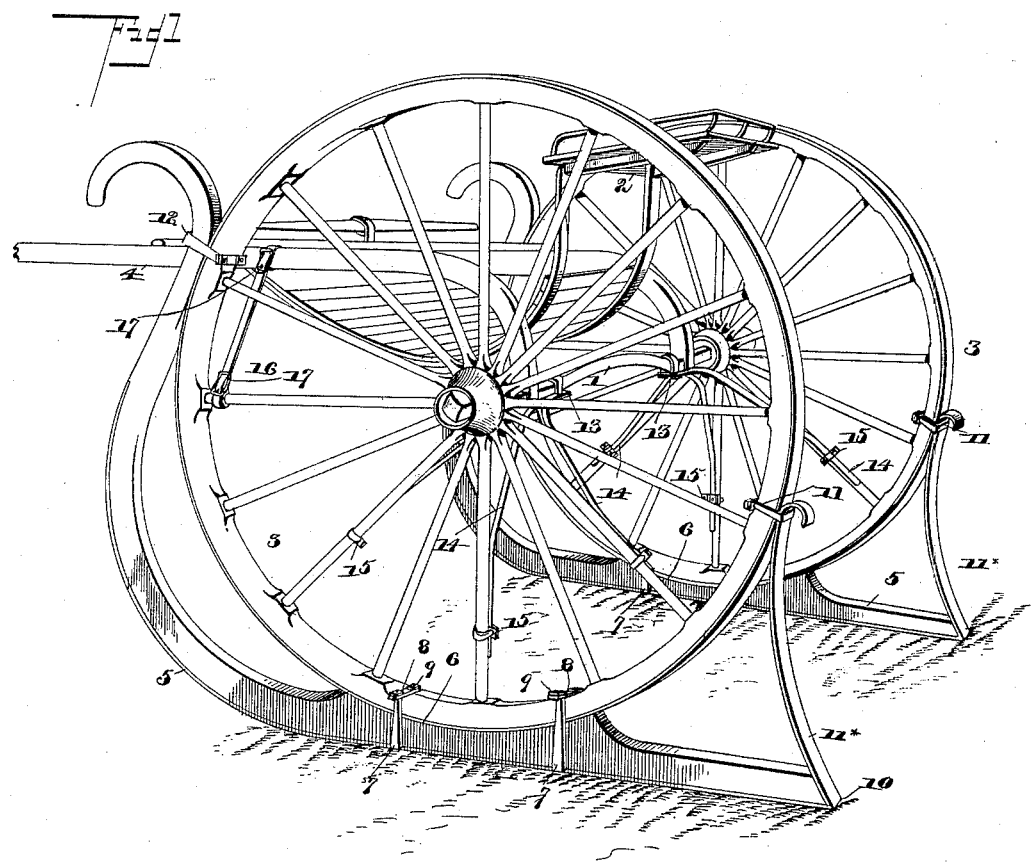
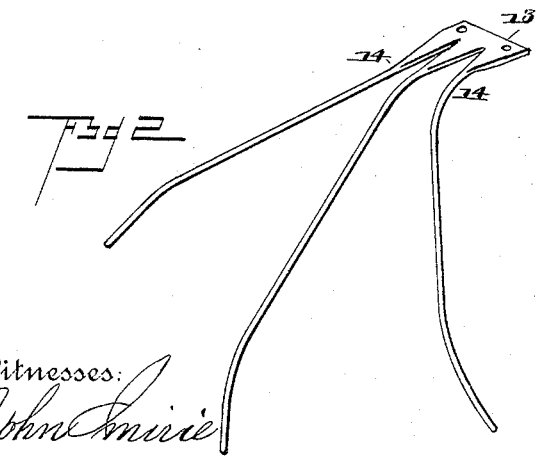
Witnesses:
John Smirie
W. S. Duvall
Inventor
Thompson T. Rogers
By his Attorneys
C. A. Snow & Co.

UNITED STATES PATENT OFFICE.

THOMPSON T. ROGERS, OF PERRY, MISSOURI.

SLEIGH-RUNNER FOR WHEELED VEHICLES.

SPECIFICATION forming part of Letters Patent No. 432,083, dated July 15, 1890.

Application filed November 19, 1889. Serial No. 330,858. (No model.)

*To all whom it may concern:*

Be it known that I, THOMPSON T. ROGERS, a citizen of the United States, residing at Perry, in the county of Ralls and State of Missouri, have invented a new and useful Temporary Runner for Vehicles, of which the following is a specification.

This invention has relation to temporary runners for vehicles, and it is especially designed for two-wheeled vehicles, such as sulkies, dog-carts, &c.

The objects and advantages of the invention will hereinafter appear, and the novel features thereof will be particularly pointed out in the claims.

Referring to the drawings, Figure 1 is a perspective of a sulky, the wheels of which are provided with runners constructed in accordance with my invention. Fig. 2 is a detail in perspective of one of the wheel-braces.

Like numerals of reference indicate like parts in all the figures.

1 represents the axle, 2 the seat-portion, 3 the wheels, and 4 the thills or shafts, of an ordinary sulky.

5 represents the opposite wooden runners, the forward ends of which terminate in any fanciful design. The upper surface of each of the runners at about the center of its flat portion is provided with a concave or curved recess 6, and at each side of the recess there is located a U-shaped clip 7, the terminals of which are threaded and adapted to embrace the opposite sides of the rim of the wheel, which is mounted in the concavity or recess. The terminals of the clip are threaded and project beyond the inner ends of the rim, and over the same there is mounted a tie-plate 8, snugly bound in position by nuts 9.

10 represents the shoe of the runner, the rear end of which extends beyond the end of the runner, as at $11^\times$, and is bent upwardly and clipped to the wheel, as at 11. The forward end of the runner is clipped to the opposite side of the wheel, as at 12.

13 represent opposite plates clipped to the axle within the wheels, and from each clip there extends a series of three prongs 14, diverging from the clip, and each connected at its outer end to the spoke of the wheel by means of a clip 15. By this construction the strain is removed from the hub of the wheel and transferred from the rim to the axle.

16 represents a strap provided with buckles 17 near each of its ends, one terminal of the strap connecting and passing around a thill and the opposite terminal around an adjacent spoke in the wheel, whereby the thills and wheels are rigidly locked together.

It is apparent from the above that the runners described will be easily applied to vehicles of the class mentioned, whereby they are transformed from wheeled vehicles to sleighs.

Having thus described my invention, what I claim, and desire to secure by Letters Patent, is—

1. The herein-described sleigh-runner attachment, comprising runners secured to the wheels, and opposite plates secured to the axle near the wheels by a single fastening device, each of said plates being provided with diverging prongs or braces, the extremities of each of which are secured to a spoke of a wheel, substantially as specified.

2. The combination, with the axle, shafts, and wheels of a vehicle, of the straps 16, connecting the shafts and spokes of the wheels, opposite runners 5 recessed, as at 6, to receive the wheels, the shoes 10, bent upward at their rear ends, as at $11^\times$, and clipped at their extremities, as at 11, the U-shaped clips embracing the runners at each side of their curved portions and connected to the wheels, the opposite perforated plates 13, arranged under each end of the axle and clipped thereto, the diverging curved prongs or braces 14, integral with the plate, and the clips 15, binding the end of each of said prongs to a spoke of the wheels, substantially as specified.

In testimony that I claim the foregoing as my own I have hereto affixed my signature in presence of two witnesses.

THOMPSON T. ROGERS.

Witnesses:
J. D. MYERS,
S. C. GILL.